(12) United States Patent
Feldmann et al.

(10) Patent No.: US 8,283,013 B2
(45) Date of Patent: *Oct. 9, 2012

(54) UNIQUELY PERFORATED WEB PRODUCT

(75) Inventors: Nakomi Lee Feldmann, Cincinnati, OH (US); Kathryn Christian Kien, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/819,434

(22) Filed: Jun. 21, 2010

(65) Prior Publication Data
US 2011/0311751 A1 Dec. 22, 2011

(51) Int. Cl.
*B32B 29/00* (2006.01)
*B26F 1/10* (2006.01)

(52) U.S. Cl. ............ 428/43; 4/245.1; 4/245.8; 162/114; 428/98; 428/131

(58) Field of Classification Search .................... 428/43, 428/131, 98; 162/114; 4/245.1, 245.8
See application file for complete search history.

(56) References Cited

U.S. PATENT DOCUMENTS

| 405,412 | A | 6/1889 | Hicks |
| 453,003 | A | 5/1891 | Hicks |
| 714,652 | A | 11/1902 | Davis |
| 1,170,589 | A | 2/1916 | Wheeler |
| 3,467,250 | A | 9/1969 | D'Elia et al. |
| 3,583,558 | A | 6/1971 | Davis |
| 3,752,304 | A | 8/1973 | Alef |
| 3,762,542 | A | 10/1973 | Grimes |
| 3,770,172 | A | 11/1973 | Nystrand et al. |
| 3,931,886 | A | 1/1976 | Yamauchi |
| 4,029,938 | A | 6/1977 | Martin |
| 4,035,611 | A | 7/1977 | Martin et al. |
| 4,100,396 | A | 7/1978 | Martin |
| 4,199,090 | A | 4/1980 | Reed |
| 4,210,688 | A | 7/1980 | Sato |
| 4,219,727 | A | 8/1980 | Bolt |
| 4,220,490 | A | 9/1980 | Carlson |
| 4,247,754 | A | 1/1981 | Baier |
| 4,355,226 | A | 10/1982 | Hall |
| 4,423,101 | A | 12/1983 | Willstead |
| 4,441,952 | A | 4/1984 | Mullane, Jr. |
| 4,457,964 | A | 7/1984 | Kaminstein |
| 4,500,770 | A | 2/1985 | Vock et al. |

(Continued)

FOREIGN PATENT DOCUMENTS

DE   3043845 A1   10/1981

(Continued)

OTHER PUBLICATIONS

Anon, "Easycut—The Fast Way to Open a Product," *Packag. Rev.*, 24(5):31 (1998), Accession No. A20114701.

(Continued)

*Primary Examiner* — Brent O'Hern
(74) *Attorney, Agent, or Firm* — Peter D. Meyer

(57) ABSTRACT

Uniquely perforated web products are disclosed which include forming selected perforation designs and patterns. The perforation designs and patterns can be formed in linear or nonlinear fashion, can extend in the cross direction or the machine direction and can be formed to complement or match an embossed or printed design on the web. The perforation designs and patterns can be formed utilizing various mechanical perforating techniques.

18 Claims, 8 Drawing Sheets

U.S. PATENT DOCUMENTS

| | | | |
|---|---|---|---|
| 4,503,318 A | 3/1985 | Hall | |
| 4,509,908 A | 4/1985 | Mullane, Jr. | |
| 4,636,161 A | 1/1987 | Raley et al. | |
| 4,646,364 A | 3/1987 | O'Larey | |
| 4,806,303 A | 2/1989 | Bianco et al. | |
| 4,842,794 A | 6/1989 | Hovis et al. | |
| 4,884,719 A | 12/1989 | Levine et al. | |
| 4,957,122 A | 9/1990 | Maldina et al. | |
| 4,995,930 A | 2/1991 | Merz et al. | |
| 5,041,317 A | 8/1991 | Greyvenstein | |
| 5,062,331 A | 11/1991 | Michal et al. | |
| 5,198,276 A | 3/1993 | Nakajima | |
| 5,202,077 A | 4/1993 | Marco et al. | |
| 5,205,454 A | 4/1993 | Schutz et al. | |
| 5,246,110 A | 9/1993 | Greyvenstein | |
| 5,405,663 A * | 4/1995 | Archibald et al. | 428/34.3 |
| 5,453,311 A | 9/1995 | Svensson | |
| 5,613,347 A | 3/1997 | Weder | |
| 5,616,387 A | 4/1997 | Augst et al. | |
| 5,704,566 A | 1/1998 | Schutz et al. | |
| 5,718,928 A | 2/1998 | Rieker | |
| 5,727,458 A | 3/1998 | Schulz | |
| 5,740,657 A | 4/1998 | Weder | |
| 5,740,658 A | 4/1998 | Weder | |
| D393,950 S | 5/1998 | Lockhart | |
| 5,755,654 A | 5/1998 | Schulz et al. | |
| 5,789,050 A | 8/1998 | Kang | |
| 5,839,688 A | 11/1998 | Hertel et al. | |
| 6,010,090 A | 1/2000 | Bushmaker et al. | |
| 6,029,921 A | 2/2000 | Johnson | |
| 6,119,439 A | 9/2000 | Stevie | |
| 6,136,209 A | 10/2000 | Kang | |
| 6,139,186 A | 10/2000 | Fraser | |
| 6,223,641 B1 | 5/2001 | Kang | |
| 6,289,777 B1 | 9/2001 | Hartmann et al. | |
| 6,460,727 B1 | 10/2002 | Irwin | |
| 6,487,762 B1 | 12/2002 | Fleissner | |
| 6,557,224 B2 | 5/2003 | Fleissner | |
| 6,565,794 B1 | 5/2003 | Fraser | |
| 6,733,626 B2 | 5/2004 | Ruthven et al. | |
| 6,735,834 B2 | 5/2004 | Fleissner | |
| 6,838,040 B2 | 1/2005 | Mlinar et al. | |
| 6,865,784 B2 | 3/2005 | Noelle | |
| 7,222,346 B2 | 5/2007 | Lenormand et al. | |
| 2002/0148085 A1 | 10/2002 | Fleissner | |
| 2003/0101557 A1 | 6/2003 | Fleissner | |
| 2003/0111169 A1 | 6/2003 | Baggot et al. | |
| 2003/0131454 A1 | 7/2003 | Noelle | |
| 2003/0132549 A1 | 7/2003 | Mlinar et al. | |
| 2003/0218040 A1 | 11/2003 | Faulks et al. | |
| 2005/0095403 A1 | 5/2005 | Noelle | |
| 2005/0241788 A1 | 11/2005 | Baggot et al. | |
| 2007/0014961 A1 | 1/2007 | Schneider et al. | |
| 2007/0209099 A1 * | 9/2007 | Issachar | 4/245.1 |
| 2008/0199660 A1 * | 8/2008 | Gelli | 428/172 |
| 2008/0280088 A1 | 11/2008 | Baum | |
| 2009/0022927 A1 | 1/2009 | Strobel et al. | |
| 2010/0163194 A1 * | 7/2010 | Sauter et al. | 162/114 |

FOREIGN PATENT DOCUMENTS

| | | |
|---|---|---|
| DE | 20013469 U1 | 11/2000 |
| DE | 102006049680 A1 | 4/2008 |
| EP | 0 054 907 A2 | 6/1982 |
| EP | 0 195 113 A2 | 9/1986 |
| EP | 0 689 819 A2 | 1/1996 |
| EP | 0 974 433 A1 | 1/2000 |
| EP | 1 529 477 A1 | 5/2005 |
| FR | 2292560 A1 | 6/1976 |
| GB | 1598188 A | 9/1981 |
| GB | 2183489 A | 6/1987 |
| GB | 2184390 A | 6/1987 |
| GB | 2184391 A | 6/1987 |
| JP | 08-084685 A | 4/1996 |
| JP | 08084685 A * | 4/1996 |
| JP | 9-279463 A | 10/1997 |
| JP | 11-091266 A | 4/1999 |
| JP | 11155759 A * | 6/1999 |
| JP | 3-140786 B2 | 3/2001 |
| JP | 2002-017607 A | 1/2002 |
| JP | 2004-049261 A | 2/2004 |
| JP | 2005-153997 A | 6/2005 |
| JP | 2005-296588 A | 10/2005 |
| JP | 2006-247311 A | 9/2006 |
| JP | 2007-117466 A | 5/2007 |
| WO | WO-92/03250 A2 | 3/1992 |
| WO | WO-03/026472 A1 | 4/2003 |
| WO | WO-2006/067260 A1 | 6/2006 |
| WO | WO-2008/068723 A1 | 6/2008 |
| WO | WO-2008/141598 A1 | 11/2008 |
| WO | WO 2010/076689 A1 | 8/2010 |

OTHER PUBLICATIONS

Klemm, "A Guide to Laser Cutting Technology, Part 1," *Screen Print*, 99(2):24-29 (2009), Accession No. A20331589.

Perkins et al., "Stress and Strain for Perforated Tensile Specimens, Part 2: FEA Simulations," *Tappi J.*, 6(4):22-27 (2007), Accession No. A20301227.

U.S. Appl. No. 12/819,271, filed Jun. 21, 2010, Hupp, Vaughn, Singer.
U.S. Appl. No. 12/819,277, filed Jun. 21, 2010, Hupp, Singer.
U.S. Appl. No. 12/819,286, filed Jun. 21, 2010, Hupp.
U.S. Appl. No. 12/819,296, filed Jun. 21, 2010, McNeil, Melliln.
U.S. Appl. No. 12/819,324, filed Jun. 21, 2010, McNeil, Mellin.
U.S. Appl. No. 12/819,344, filed Jun. 21, 2010, McNeil, Mellin.
U.S. Appl. No. 12/819,367, filed Jun. 21, 2010, McNeil, Singer.
U.S. Appl. No. 12/819,380, filed Jun. 21, 2010, McNeil, Singer.
U.S. Appl. No. 12/819,388, filed Jun. 21, 2010, McNeil, Singer.
U.S. Appl. No. 12/819,399, filed Jun. 21, 2010, Redd.
U.S. Appl. No. 12/819,420, filed Jun. 21, 2010, Kien, Redd.

* cited by examiner

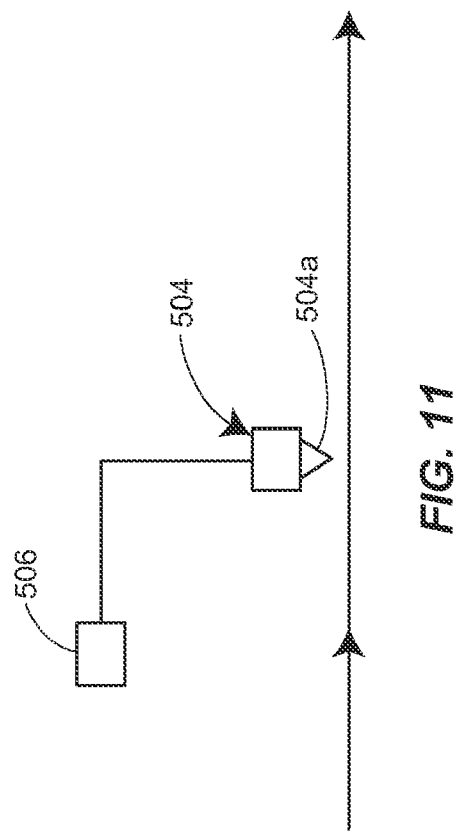

UNIQUELY PERFORATED WEB PRODUCT

FIELD OF THE INVENTION

The present invention relates generally to perforated web products having various capabilities, characteristics and features. More particularly the present invention relates to web products of this type having significantly improved reliability, lower manufacturing costs, greater flexibility, and higher perforation quality.

BACKGROUND OF THE INVENTION

For many years, it has been well known to perforate products manufactured from webs such as paper towels, bath tissue and the like to thereby facilitate the removal of sheets from a roll by tearing. There have been proposed a variety of types of mechanical apparatus and numerous different methods for forming the perforations for these products. Typically, a moving blade has been utilized to perforate a web as it passes between the moving blade and a stationary anvil wherein the moving blade extends perpendicular to the direction of travel of the web.

While this conventional operation has been widely adopted, there are a number of well known drawbacks in terms of the overall reliability, manufacturing costs, flexibility, and perforation quality. Among the drawbacks is the fact that the interaction of the moving blade and the stationary anvil is known to impose a speed limitation since vibrations produced at high speeds adversely affect the overall quality of the perforations formed in a web. Further, the vibrations caused by the interaction of the moving blade and stationary anvil may result in costly web breaks or equipment malfunctions requiring a shutdown of the manufacturing operation.

For instance, it is known that the teeth on the moving blade become dull or broken after a period of use. This not only will result in an inferior and unacceptable level of perforation quality, but it will also require a temporary shutdown of the manufacturing operation to replace the moving blade and to discard inferior product produced immediately prior to shutdown. As will be appreciated, this results in unacceptable waste and significantly increased manufacturing costs.

In addition, another drawback to conventional equipment has been the inability to quickly change from one perforation pattern format (or sheet length) to another without significant down time for the changeover. It has typically been the case that this type of changeover requires the manufacturing operation to be shut down for at least several hours. While the changeover is occurring, there is obviously no product being produced and personnel must be actively engaged in implementing the changeover, all of which leads to significantly increased manufacturing costs.

In another respect, there has been a continuing need for greater flexibility in order to produce products having enhanced consumer desirability. For instance, it would be desirable to be able to produce both linear and nonlinear perforations as well as perforations extending in both the cross and machine directions. While various approaches have been suggested, none have offered the requisite level of perforation quality that would result in a fully acceptable product.

Additionally, it would be desirable to have perforations that are sufficiently strong to withstand winding of a web but also sufficiently weaken at least at the edges to facilitate the separation of one sheet from the next. Further, it would be desirable to have a wound or rolled perforated web product which is manufactured in such a manner that it is possible for a line of perforations to complement, register with, or match an embossed or printed pattern on the web.

While various efforts have been made in the past which were directed to overcoming one or more of the foregoing problems and/or to providing one or more of the foregoing features, there remains a need for perforating apparatuses and methods and perforated web products having improved reliability, lower manufacturing costs, greater flexibility, and higher perforation quality.

SUMMARY OF THE INVENTION

While it is known to manufacture perforated web products such as paper towels, bath tissue and the like to facilitate the removal of sheets from a roll by tearing, it has remained to provide perforated web products that overcome the noted problems and provide the noted features. Embodiments of the present disclosure provide perforated web products having improved features which result in multiple advantages including enhanced reliability, lower manufacturing costs, greater flexibility, and higher perforation quality. Such products not only overcome the problems noted with currently utilized conventional manufacturing operations, but they also make it possible to design and produce perforated products such as paper towels, bath tissue, and the like having enhanced practical and aesthetic desirability for the consumer.

In these embodiments, a web product is formed of a fibrous material having one or more plies to be converted into a through air dried product and having a first side and a second side including a plurality of spaced apart and repeating lines of perforation. In this connection, the repeating lines of perforation may each comprise a plurality of individual perforations which are formed in the web. The plurality of individual perforations extend generally in the cross direction of the web and at least one line of perforations extends generally in the machine direction of the web whereby a selected perforation design is provided in the web.

BRIEF DESCRIPTION OF THE DRAWINGS

FIG. 11 is a schematic view illustrating yet another apparatus for printing a liquid onto a web liquid printing device without contacting the web;

DETAILED DESCRIPTION OF THE INVENTION

As used herein, the term "machine direction" (MD) means the direction of travel of a web through any processing equipment. The term "cross direction" (CD) is orthogonal and coplanar thereto. The term "Z-direction" is orthogonal to both the machine and cross directions.

The various embodiments of the present disclosure described in detail below provide several non-limiting examples of perforating apparatuses, methods, and several distinct perforated web products having improved features which result in enhanced reliability, lower manufacturing costs, greater flexibility, and higher perforation quality. With regard to these non-limiting examples, the described apparatuses and methods make it possible to effectively and efficiently design and produce a variety of different perforated web products having enhanced practical and aesthetic desirability.

Figure 1:
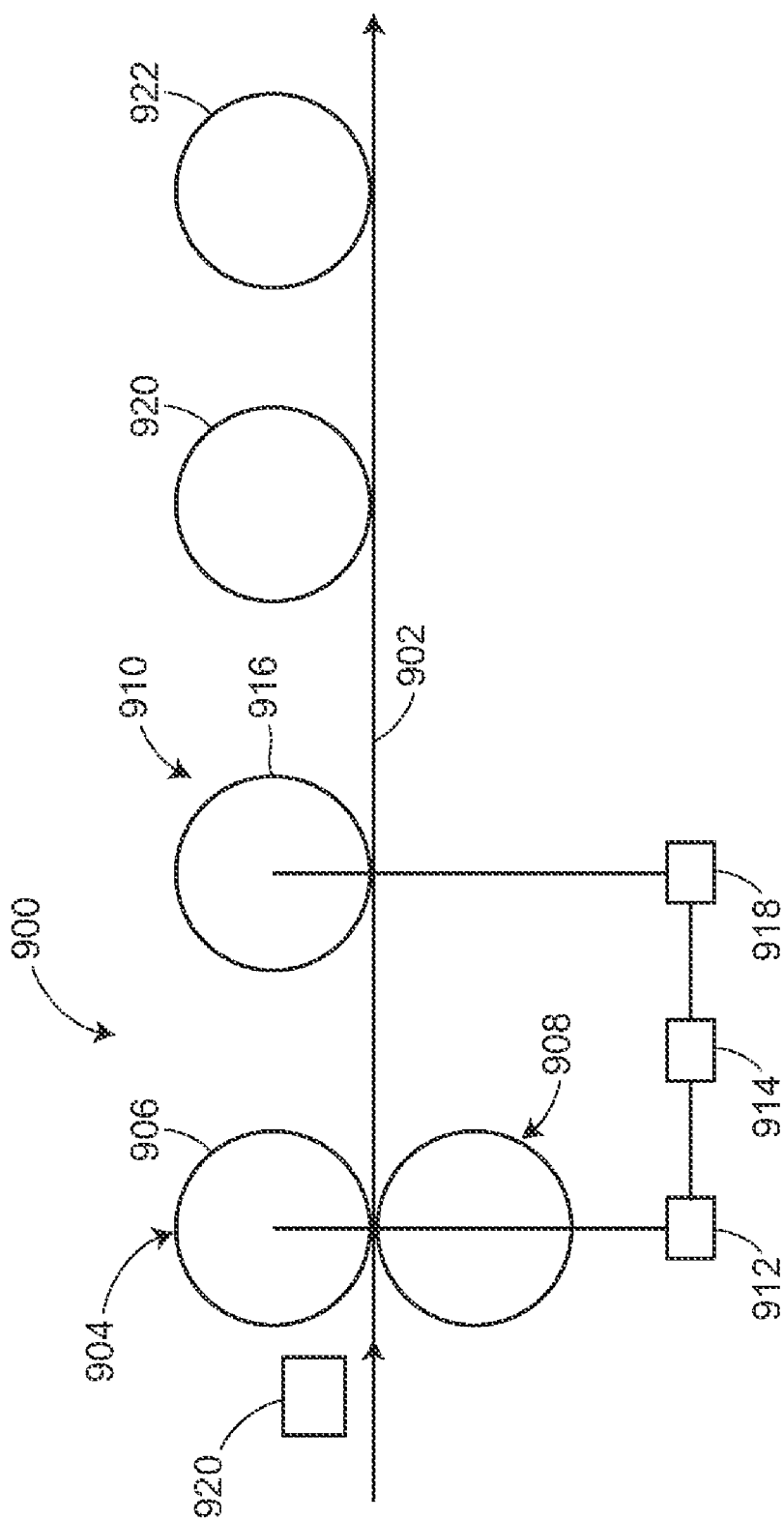
FIG. 1 is a schematic view illustrating an apparatus for perforating a web in both a cross direction and a machine direction.

Referring first to FIG. 1, an apparatus 900 is illustrated for perforating a web 902 in both a cross direction and a machine direction. The apparatus 900 will be seen to include a rotatable roll 904 having an outer surface 906 for engaging the web 902 during rotation of the rotatable roll 904, and it also will be seen to include a discrete web perforator 908 for forming individual perforations extending generally in the cross direction of the web. In addition to the foregoing, the apparatus 900 also includes at least one additional web perforator generally designated 910.

With this arrangement, the discrete web perforator 908 and the at least one additional web perforator 910 are positioned so as to produce a selected perforation design. A motor 912 is provided for imparting rotation to the rotatable roll 904 while the web 902 is engaged by the outer surface 906. Further, a controller 914 causes the discrete web perforator 908 and the at least one additional web perforator 910 to cooperate to produce the selected perforation design.

Figure 2:
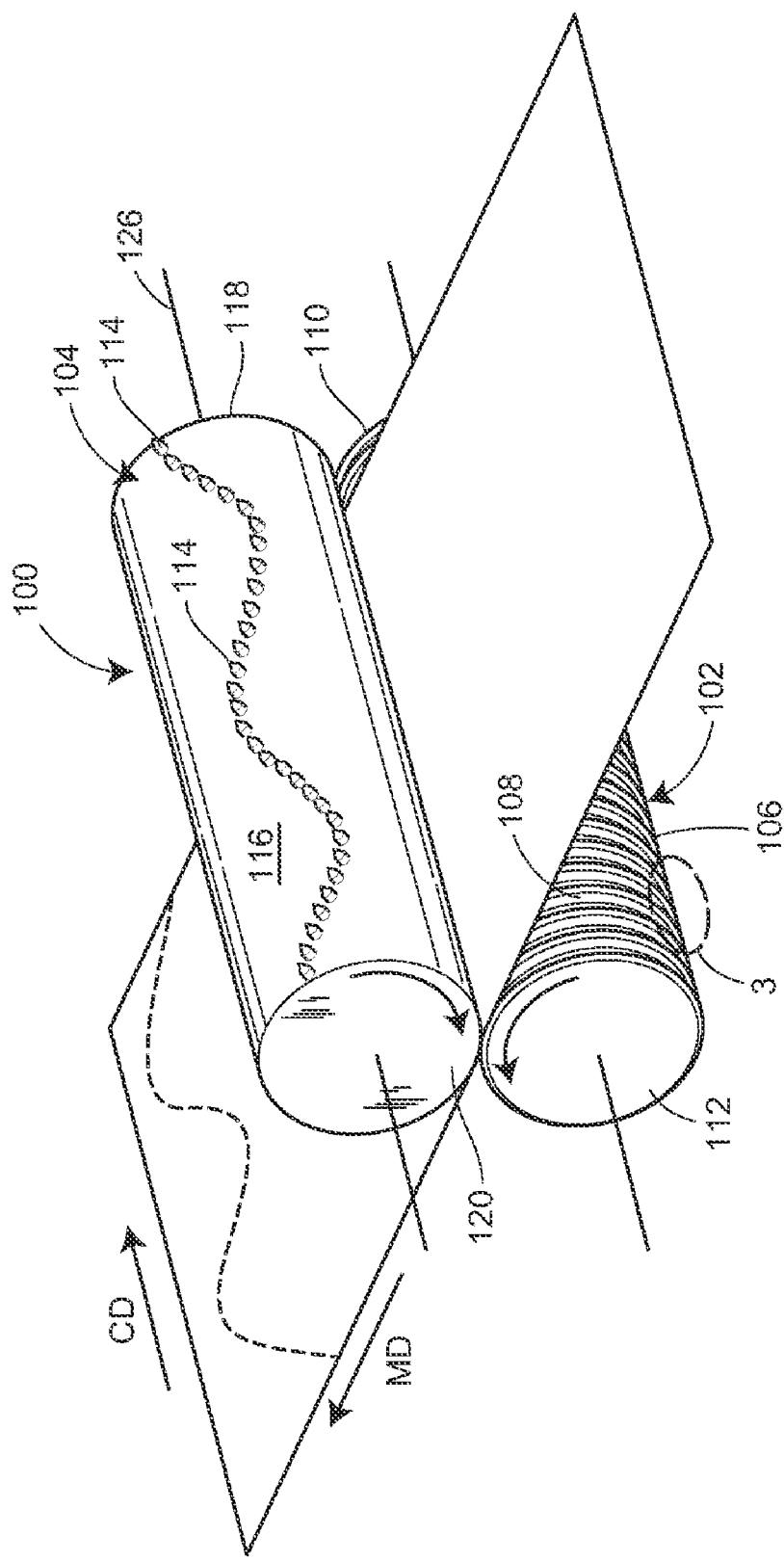
FIG. 2 is a perspective view of an apparatus for perforating a web utilizing a rotatable ring roll having at least one circumferential groove and a rotatable pattern roll having circumferential protrusions in cooperative alignment with the at least one circumferential groove.
Figure 3:
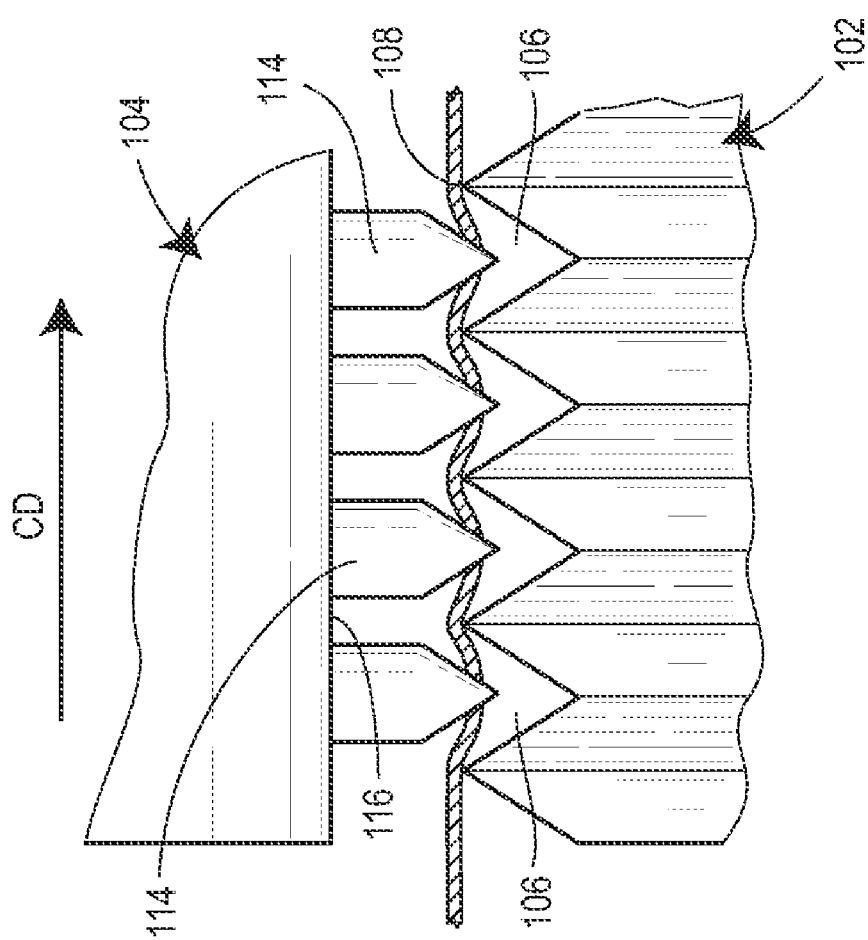
FIG. 3 is a detailed view illustrating the circumferential protrusions on the rotatable pattern roll in cooperative alignment with the at least one circumferential groove in the rotatable ring roll and with the circumferential protrusions penetrating a web to form perforations.
Figure 4:
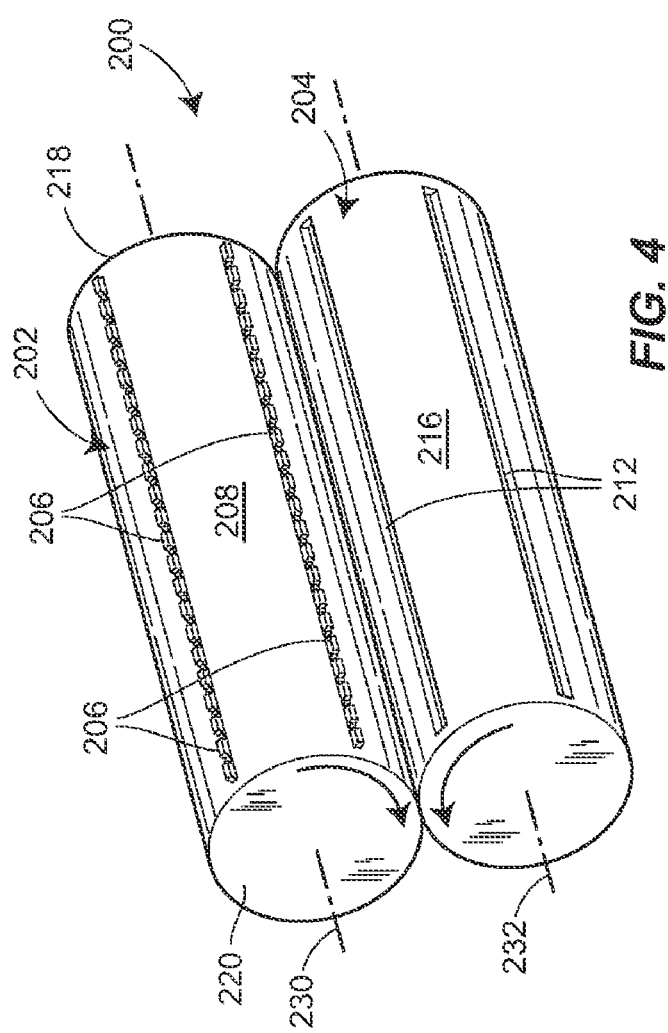
FIG. 4 is a perspective view of an apparatus for perforating a web utilizing a rotatable male roll having perforating elements defining web engaging edges and a rotatable female roll having a pocket for receiving the perforating elements and defining a web supporting edge.
Figure 5:
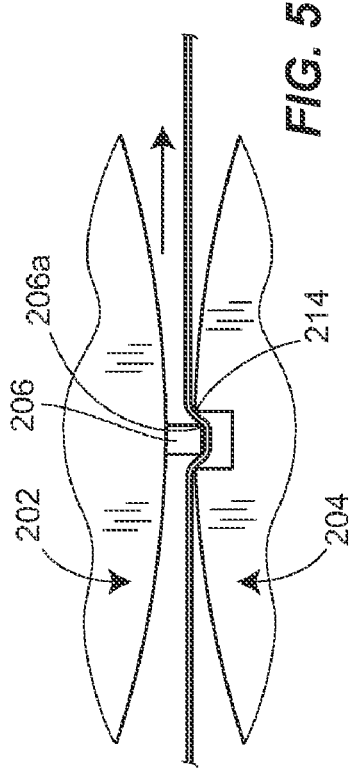
FIG. 5 is a side elevational view illustrating a web engaging edge defined by a perforating element overstraining a web.

With regard to the foregoing, the rotatable roll 904 may comprise a ring roll such as 102 generally in the form illustrated in FIGS. 2 and 3 or a female roll such as 204 generally in the form illustrated in FIGS. 4 and 5. Thus, the discrete web perforator 908 may comprise a pattern roll such as 104 generally as illustrated in FIGS. 2 and 3 or a male roll such as 202 generally as illustrated in FIGS. 4 and 5. Alternatively, the discrete web perforator may comprise a plurality of individual printing devices such as 304, 404, and 504 in the various embodiments illustrated in FIGS. 7 and 8, FIGS. 9 and 10, and FIG. 11, respectively.

In addition, the at least one additional web perforator 910 may comprise a rotary cutting die 916 for forming a line of perforations extending in the machine direction of the web generally perpendicular to perforations formed by the discrete web perforator which may extend generally in the cross direction of the web. The apparatus 900 may also include a motor 918 controlled by the controller 914 for imparting rotation to the rotary cutting die 916. Further, the apparatus 900 may include another cutting die 920 for removing a notch from each of opposite sides of the web 902 at the ends of the individual perforations which extend generally in the cross direction and an embossing or printing device 922 for embossing or printing an aesthetic pattern on the web 902.

If an embossing or printing device such as 922 is provided for embossing or printing an aesthetic pattern on the web 902, the discrete web perforator 908 may be arranged so a selected perforation design produced by the discrete web perforator complements, registers with, or matches the aesthetic pattern embossed or printed on the web 902.

Referring to FIGS. 2 and 3, the previously discussed rotatable ring roll 102 and rotatable pattern roll 104 are illustrated in detail. The ring roll 102 is formed so as to have at least one circumferential groove 106 extending about an outer surface 108, i.e., the ring roll 102 may in one form include a single circumferential groove extending in a helical manner about the outer surface 108 from one end 110 to the other end 112 of the ring roll 102. However, the ring roll 102 may be formed to have a plurality of parallel circumferential grooves 106 in another form.

As shown in FIGS. 2 and 3, the circumferential grooves 106 formed in the outer surface 108 of the ring roll 102 are parallel although it will be readily apparent from these two views as well as the detailed description below of the pattern roll 104 how a single helical circumferential groove extending about the outer surface 108 from the one end 110 to the other end 112 of the ring roll 102 could be used in place of the illustrated parallel circumferential grooves 106.

Still referring to FIGS. 1 and 2, the pattern roll 104 has circumferential protrusions 114 extending from an outer surface 116. The circumferential protrusions 114 in a non-limiting example may be disposed from one end 118 to the other end 120 of the pattern roll 104 and located in a nonlinear fashion as shown or in a linear fashion. The circumferential protrusions 114 are positioned in selected cooperative alignment with the circumferential groove(s) 106.

In other words, the circumferential protrusions 114 are positioned relative to the circumferential groove(s) 106 as shown in FIG. 2. The circumferential protrusions 114 may be shaped substantially as shown in FIG. 4, although it will be appreciated that the circumferential protrusions 114 may take various other forms. Also, as previously suggested, they may be circumferentially positioned in any location on the outer surface 116 of the pattern roll 104.

As shown in FIGS. 1 and 2, the web 902 may be transported along a path between the ring roll 102 and the pattern roll 104 by a device which may comprise a conventional web rewinder of a type well known in the art. Also, rotation may be imparted to the ring roll 102 and the pattern roll 104 through the motor 912 controlled by the controller 904 in FIG. 1 by a conventional motor and gear arrangement of a type well known in the art. In this manner, the circumferential protrusions 114 are caused to penetrate the web 902 as it is transported along the path between the ring roll 102 and the pattern roll 104 to produce a selected perforation design.

As will be appreciated, the circumferential protrusions 114 extending from the outer surface 116 of the pattern roll 104 penetrate the web 902 by mating with the circumferential groove(s) 106 extending about the outer surface 108 of the ring roll 102. FIG. 3 illustrates that the ring roll 102 is positioned in relation to the pattern roll 104 to provide a selected degree of penetration of the web 902 by the circumferential protrusions 114 to control the degree of weakening of the web 902. Furthermore, it will be appreciated that the degree of penetration of the web 902 may be controlled by linear actuators or the like to adjust the position of the pattern roll 104 so as to be closer to, or further away from, the ring roll 102, as desired.

In addition, the circumferential protrusions 114 may be sized and/or shaped to provide a selected degree of weakening of the web 902 when the circumferential protrusions 114 penetrate the web 902 to produce a selected perforation design. Alternatively, the circumferential protrusions 114 may be provided with a pitch or angle to provide a selected degree of weakening of the web 902 when the circumferential protrusions 114 penetrate the web 902 to produce a selected perforation design. The circumferential protrusions 114 extend generally along an axis of rotation 126 for the pattern roll 104 (see FIG. 2), and they are individually circumferentially positioned about the outer surface 116 to produce the selected perforation design.

Referring to FIGS. 4 and 5, the previously discussed rotatable male roll 202 and rotatable female roll 204 are illustrated in detail. The male roll 202 includes perforating elements 206 which define web engaging edges 206a wherein the web engaging edge 206a of each of the perforating elements 206 is spaced outwardly of an outer surface 208 of the male roll 202 in position for overstraining a web. The female roll 204 has a pocket 212 which defines a web supporting edge 214 wherein the pocket 212 defining the web supporting edge 214 extends inwardly to define a recess in an outer surface 216 of the female roll 204 in position to receive the perforating elements 206 and the web. In this connection, FIGS. 4 and 5 clearly illustrate how the pocket 212 in the female roll 204 receives the perforating elements 206 and the web.

In particular, FIGS. 4 and 5 illustrate that the perforating elements 206 on the male roll 202 and the pocket 212 in the female roll 204 are located such that the pocket 212 in the female roll 204 will receive the perforating elements 206 on the male roll 202 during rotation of the male roll 202 and the female roll 204. More specifically, the male roll 202 is positioned relative to the female roll 204 so the web engaging edges 206a are closely spaced from the web supporting edge 214 by a distance selected to permit the web engaging edges 206a to overstrain the web without making contact with the web supporting edge 214. In other words, when the perforating elements 206 on the male roll 202 are received in the pocket 212 in the female roll 204 as illustrated in FIG. 5, the web engaging edges 206a defined by the perforating elements 206 will be closely spaced from, but not make contact with, the web supporting edge 214.

As shown in FIGS. 4 and 5, the web 902 may be transported along a path between the male roll 202 and the female roll 204 by a device which may comprise a conventional web rewinder of a type well known in the art. Also, rotation may be imparted to the male roll 202 and the female roll 204 through motor 912 controlled by controller 914 in FIG. 1 by a conventional motor and gear arrangement of a type well known in the art. In this manner, the perforating elements 206 are arranged for pushing the web 902 into the pocket 212 to force the web 902 against the web supporting edge 214 during rotation of the male and female rolls.

As will be appreciated, the web engaging edge 206a defined by each of the perforating elements 206 on the male roll 202 overstrains the web 902 at a single location in cooperation with the web supporting edge 214. FIG. 5 illustrates that the male roll 202 is positioned in relation to the female roll 204 to provide a selected degree of overstraining by selecting a predetermined distance for the web engaging edge 206a to extend into the pocket 212 and selecting the distance the web engaging edge 206a is spaced from the web supporting edge 214. By selecting these two distances, it is possible to control the degree of web engagement to thereby control the size of the perforations produced as the web 902 passes between the male roll 202 and the female roll 204.

In particular, it is possible to control the degree to which the web 902 is overstrained to weaken a selected area without the web engaging edge 206a ever contacting the web supporting edge 214 or the bottom of the pocket 212 whereby the selected area on the web 902 is weakened by disrupting the fiber structure of the web 902 by a desired amount up to and including a condition wherein the web 902 has been sheared.

Figure 8:
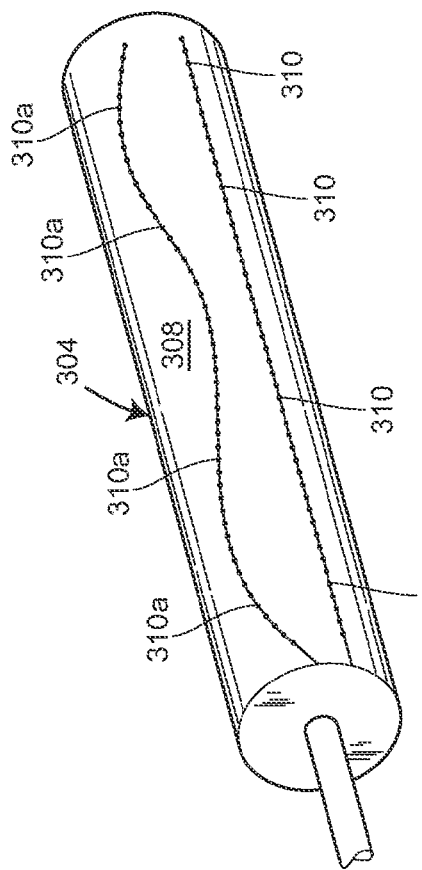
FIG. 8 is a perspective view of the permeable roll as schematically illustrated in FIG. 7 printing the liquid onto the web.

While there are multiple sets of the perforating elements 206 and pockets 212 provided on the male roll 202 and in the female roll 204, respectively, in the non-limiting example of FIG. 8, it will be appreciated that only a single set is required.

Figure 6:
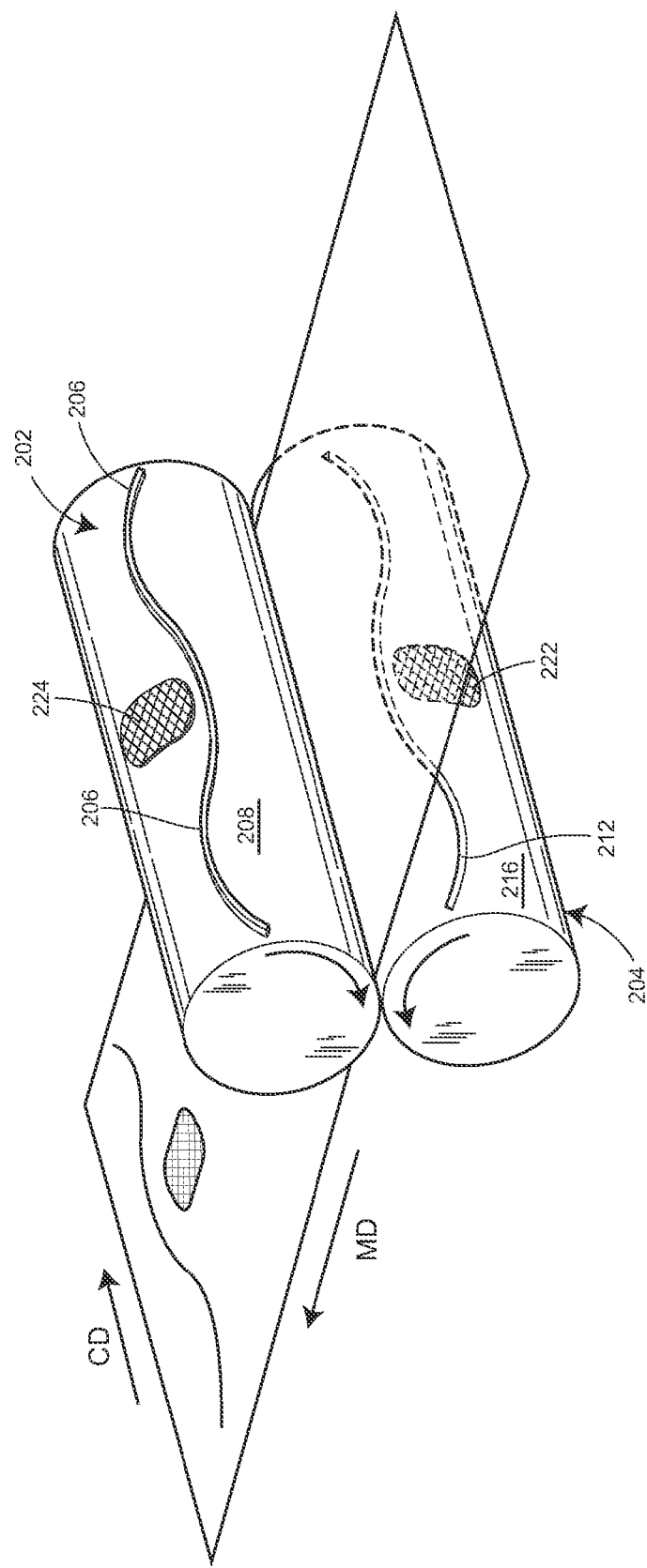
FIG. 6 is a perspective view similar to FIG. 4 but including a female emboss pattern on the female roll, a male emboss pattern on the male roll, nonlinear perforating elements on the male roll and a nonlinear pocket in the female roll to receive the nonlinear perforating elements.

As shown in FIG. 4, the perforating elements 206 in a non-limiting example may be disposed from one end 218 to the other end 220 of the male roll 202. The perforating elements 206 also may suitably be disposed in a linear fashion as shown, or in a nonlinear fashion as illustrated in FIG. 6. In either case, the perforating elements 206 are positioned to be in selected cooperative alignment with an appropriately sized and correspondingly shaped pocket 212.

Referring to FIG. 6, the female roll 204 may have a selected female embossing pattern 222 on the outer surface 216. There may also be provided a corresponding male embossing pattern 224 for engagement with the female embossing pattern 222. A selected embossing pattern may thereby be formed on the web 902 by engaging the male and female embossing patterns.

In the non-limiting example of FIG. 6, the male embossing pattern 224 is on the outer surface 208 of the male roll 202. However, the male embossing pattern may be provided on a separate rotatable male embossing roll such as 922 (FIG. 1).

In either case, the pockets 212 in the female roll 204 are located relative to the female embossing pattern 222 so the selected perforation pattern produced by the web engaging edges 206a of the perforating elements 206 complements, registers with, or matches the selected embossing pattern produced by the male and female embossing patterns 222 and 224.

While not specifically shown, it will be understood that in each of the two embodiments discussed above, a selected perforation pattern or design can be formed which includes perforations extending not only in the cross direction, but also extending in the machine direction and includes perforations extending linearly, nonlinearly or both linearly and nonlinearly.

Figure 7:
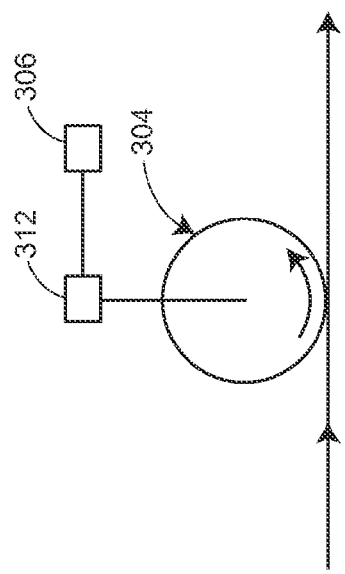
FIG. 7 is a schematic view illustrating an apparatus for printing a liquid onto a web utilizing a permeable roll as a liquid printing device.

Referring to FIG. 7, the previously discussed individual printing device 304 may comprise a liquid printing device at least in close proximity to a web when it is moved past the liquid printing device. The liquid printing device 304 is supplied with a liquid weakener and adapted to print the liquid weakener onto a web at each of a plurality of discrete locations extending generally in a cross direction of the web. The liquid printing device 304 can be operatively associated with a controller 306 (corresponding to the controller 914 in FIG.

1) to cause the liquid printing device 304 to cyclically print the liquid weakener onto a web.

More specifically, a web such as 902 (FIG. 1) may be transported along a path that passes by the liquid printing device 304 (FIG. 7) by a conventional web rewinder as is well known in the art. In this non-limiting embodiment, the liquid printing device 304 may comprise a permeable roll (see, e.g., FIG. 8) having an outer surface 308 for engaging the web 902 to print the liquid weakener onto the web 902 through apertures 310 at each of the plurality of discrete locations. In FIG. 8, the apertures 310 form a linear set of apertures extending generally in the cross direction of the web 902, but apertures such as 310a forming a nonlinear set of apertures also may be used.

In this connection, it will be appreciated that, as shown, both the linear set of apertures 310 and the nonlinear set of apertures 310a extend generally in the cross direction of the web 902. Therefore, due to the versatility of this embodiment, it is possible to utilize one or more linear sets of apertures 310, and/or one or more nonlinear sets of apertures 310a, and/or one or more linear and nonlinear sets of apertures extending in the cross direction and/or the machine direction. Because of using a permeable roll for the liquid printing device 304, there are few if any limitations on the perforation patterns that can be formed in the web 902.

With regard to the controller 306 (corresponding to the controller 914 in FIG. 1), it may be coupled to a motor 312 (corresponding to the motor 912 in FIG. 1) provided to impart rotational movement to the permeable roll 304 (corresponding to the discrete web perforator 908 in FIG. 1). The controller 306 will typically cause the motor 312 to drive the permeable roll 304 in such a manner that it will rotate at a speed where the instantaneous speed of the permeable roll 304 at the point at which it makes contact with the web 902 will be substantially the same as the speed at which the web 902 is transported in the machine direction of the web. The motor 312 may be of any well known conventional type that is commonly used for imparting rotation to rolls in a web handling environment and, thus, need not be described in any detail herein.

Figure 9:
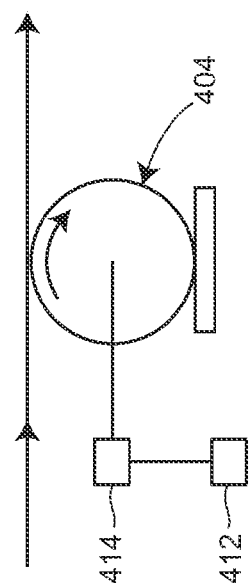
FIG. 9 is a schematic view illustrating another apparatus for printing a liquid onto a web utilizing an offset roll as the liquid printing device.

Referring to FIG. 9, the previously discussed individual printing device 404 may comprise a liquid printing device at least in close proximity to a web when it is moved past the liquid printing device. The liquid printing device 404 in this non-limiting embodiment comprises an offset roll (see FIG. 10) having a print image generally designated 406 on an outer surface 408 of the offset roll 404. The print image 406 may be comprised of a plurality of individual print elements 410, each of which is adapted to print a liquid weakener onto a web at one of the plurality of discrete locations where liquid weakener is to be printed onto the web.

Figure 10:
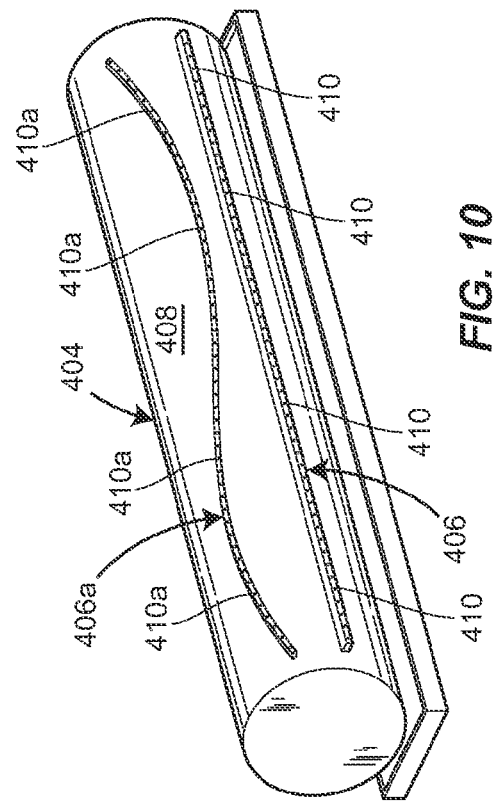
FIG. 10 is a perspective view of the offset roll as schematically illustrated in FIG. 9 printing the liquid onto the web.

As with the liquid printing device 304, the liquid printing device 404 is supplied with a liquid weakener and adapted to print the liquid weakener onto a web at each of the plurality of discrete locations extending generally in the cross direction of the web. The web such as 902 (FIG. 1) may be transported along a path that passes by the liquid printing device 404 (FIG. 9) by a conventional web rewinder. In FIG. 10, the print elements 410 forming the print image 406, as shown, are linearly arranged for printing the liquid weakener in a linear pattern extending in the cross direction of the web 902 as a result of direct contact with the moving web 902.

Alternatively, a nonlinear print image 406a comprised of a plurality of print elements 410a arranged nonlinearly may be utilized for printing the liquid weakener in a nonlinear pattern extending in the cross direction of the web 902. As with the liquid printing device 304, it is possible to utilize one or more sets of linear print elements 410, and/or one or more nonlinear sets of print elements 410a, and/or one or more linear and nonlinear sets of print elements extending in the cross direction and/or machine direction. By using an offset roll for the liquid printing device 404, there are again few, if any, limitations as to the perforation pattern(s) that can be formed.

With regard to the liquid printing device 404, it may be operatively associated with a controller 412 (corresponding to the controller 914 in FIG. 1) and it may be coupled to a motor 414 (corresponding to the motor 912 in FIG. 1). These components cause the offset roll 404 to cyclically print the liquid weakener onto the web 902 at the discrete locations corresponding to the locations of the individual print elements. As will be appreciated, the motor 414 may be of any well known conventional type commonly used to impart rotation to rolls in a web handling environment where the speed of the motor can be suitably controlled by a conventional controller.

With regard to both the permeable roll 304 and the offset roll 404, they are positioned in relation to the web 902 so that the outer surface 308 of the permeable roll 304 and the print elements 410 and/or 410a make actual contact with the web 902 during rotation.

With regard to the liquid weakener supplied to the liquid printing devices 304 and 404, it may suitably comprise a debonder for printing onto the respective webs 302 and 402 at each of the discrete locations where perforations are to be formed which may comprise one or more materials selected to chemically react with the web substrate material to cause the perforations to be formed at each of the discrete locations where the debonder is printed onto the web. By way of example only and not limitation, the debonders which may be suitable for printing on paper may comprise water, hydrochloric acid, other acids, Di-tallow dimethyl ammonium methyl sulfite (DTDMAMS); Di-ethyl ethoxylated di-methyl ammonium chlorite (DEEDMAC); Di-ethoxylated ethyl dimethyl ammonium methyl sulfate (DEEDMAMS)+PEG, or any other material that will produce weakening in a particular web substrate when printed onto the web.

The liquid weakeners selected for use will act over time so the perforations they form will provide the web with a first perforation tensile strength during production and a second, weaker perforation tensile strength after the web has been converted into a finished product such as paper towels, bath tissue and the like. This makes it possible for the web to have a sufficient perforation tensile strength during the course of the manufacturing process to be able to successfully avoid any undesirable breaks in the web. However, since the perforations will provide the web with a second, weaker perforation tensile strength after it has been converted into a finished wound or rolled paper product, the consumer can separate a selected sheet or sheets from the remainder of the finished product by tearing along a corresponding line of perforations.

Referring to FIG. 11, the previously discussed individual printing device 504 may comprise a non-contact liquid printing device positioned to be in close proximity to a web when the web is moved past the liquid printing device. In this non-limiting embodiment, the liquid printing device 504 comprises a plurality of print nozzles 504a in close non-contacting relation to a web for printing the liquid weakener onto the web at each of a plurality of discrete locations.

As will be appreciated, FIG. 11 is a schematic view which is taken generally from one side of a web such as 902 (FIG. 1) as it is being transported generally in the machine direction of the web past the print nozzles 504a. The print nozzles 504a may be arranged to print the liquid weakener at each of the plurality of discrete locations extending generally across the web 902 in the cross direction to produce a selected perforation pattern. Further, a controller 506 may be provided to control the operation of the print nozzles 504a so they cyclically print the liquid weakener onto the web 902 in such a manner as to produce repeating lines of perforations.

As will be appreciated, the controller 506 may correspond to the controller 914 although in this embodiment it controls the operation of the print nozzles 504a only. Unlike the embodiments illustrated in FIGS. 7-10, there are no rotational components such as the permeable roll 304 and offset roll 404. Further, none of the liquid printing devices 304, 404, and 504 require a rotatable roll 904 on the side of the web 902 opposite the respective liquid printing devices.

By way of example and not limitation, the non-contact liquid printing device 504 may comprise one or more inkjet printers, one or more laser printers, or any other comparable type of non-contact liquid printing device that is now available or may become available in the future.

The liquid printing devices 304, 404, and 504 may all be used to print a liquid weakener at a plurality of discrete locations where perforations are to be formed in a manner making it possible to produce virtually any selected perforation design. As a result, and by way of example, the selected perforation design which is produced by these apparatuses may be linear or have linear components and/or the design may be nonlinear or have nonlinear components. However, regardless of the selected perforation design, it may be produced by any of the apparatuses disclosed herein while providing significantly improved reliability, lower manufacturing costs, greater flexibility, and higher perforation quality.

In addition, it will be understood that at least some of the discrete locations where perforations are to be formed may be disposed generally from a first to a second side of the web in a cross direction or between the first and the second side of the web in the machine direction or in both the cross direction and the machine direction.

Figure 12:
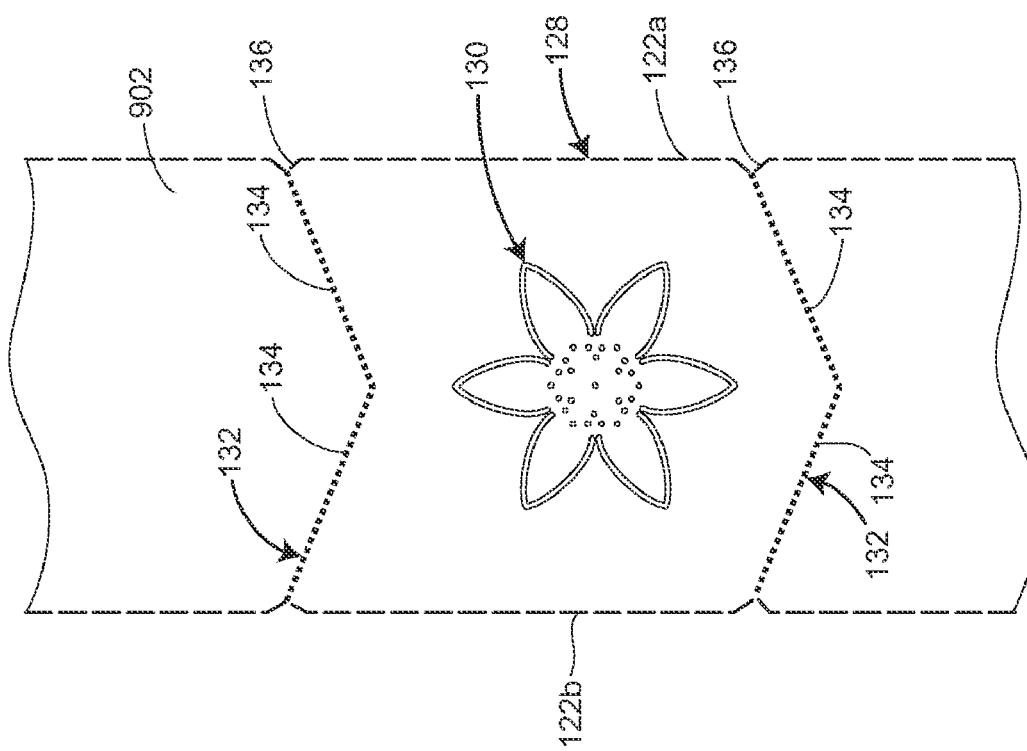
FIG. 12 is a plan view of a single sheet of a perforated web product having an embossed or printed pattern formed thereon and also having the selected perforation design utilizing any of the foregoing apparatuses.

Referring to FIG. 12, an embossed or printed indicia or aesthetic pattern 130 may be present on a single sheet 128 formed on the web 902. The single sheet 128 has a shaped perforation pattern 132 extending generally in the cross direction which can complement, register with or match the indicia or aesthetic pattern 130, if desired. As shown, the contours of the perforation pattern 132 form a chevron shape which is complementary to the indicia or aesthetic pattern 130 by appropriate arrangement of the plurality of discrete perforations. An exemplary but non-limiting apparatus and process for registering repeating shaped perforation patterns 132 that are formed in web 122 with the indicia or aesthetic pattern 130 are disclosed in U.S. Pat. Nos. 7,222,436 and 7,089,854.

As shown in FIG. 12, the repeating lines of perforation may comprise a plurality of individual perforations 134 extending substantially from the first side 122a to the second side 122b of the web 902. Each one of the plurality of individual perforations 134 is selectively located in relation to the adjacent ones of the individual perforations 134. In this manner, a selected perforation design such as the shaped perforation patterns 132 is provided for each of the repeating lines of perforation which are formed along the web 902.

Figure 13:
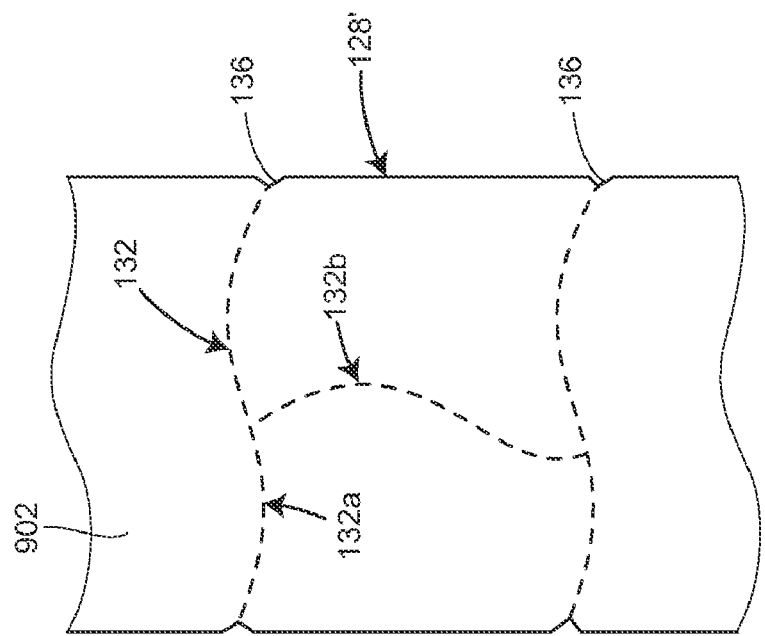
FIG. 13 is a plan view of a single sheet of a perforated web product having another of many different perforation designs or shapes extending non-linearly in the cross direction as well as the machine direction of the web.

It will be appreciated that the single sheet 128, as shown in FIGS. 12 and 13, has a cut out 136 at each of the opposite ends of the repeating lines of perforation or perforation patterns 132 forming the sheet 128 which may be formed by a rotary cutting die such as 920 discussed above to facilitate starting the removal of a sheet from the remainder of the wound or rolled product.

In one non-limiting embodiment, the web 902 is presented to the consumer as a convolutely wound or rolled paper product. Such a product is suitable for use as paper towels, bath tissue and the like and may have a length in the machine direction of at least 500 inches and most preferably up to at least about 1000 inches. To separate one product from the next, a chop-off cut is used to terminate one product and start the succeeding product during manufacture.

To achieve the foregoing, the apparatus 900 may further include a chop-off roll 36 and a bedroll 38 at a downstream end of the perforation operation to form a chop-off in the manner illustrated and described in U.S. Pat. No. 7,222,436. The perforation pattern formed by the various embodiments may be linear or non-linear and may or may not extend perpendicular to the machine direction of the web 902. Similarly, the chop-off may take various forms although in one non-limiting embodiment the chop-off may be shaped rather than straight, e.g., and by way of example only, the chop-off may be chevron shaped substantially in the form shown in FIG. 12. FIG. 12 illustrates generally a plurality of perforations that may advantageously take the form of a shaped perforation pattern 132. However, the chop-off may roll may be formed so that only the chop-off will be shaped. By so doing, it will facilitate the consumer starting the removal of sheets from an exposed end of the wound or rolled perforated paper product.

In addition, the chop-off may have this or a similar shape or design by appropriately forming the chop-off roll regardless of whether the perforation pattern has the same or a similar shape or design or is simply linear and orthogonal to the machine direction of the web 902.

Referring to FIG. 13, a single sheet 128' is illustrated when produced with any of the various embodiments discussed in detail above. The single sheet 128' has a perforation pattern 132 which is comprised of a non-linear perforation pattern 132a' extending generally in the cross direction of the web 902 and a non-linear perforation pattern 132b' extending generally in the machine direction of the web 902. The contours of the perforation patterns 132a' and 132b' can take virtually any form or location by appropriately arranging the individual perforations.

As used throughout the specification and claims, the word "penetrate" and any variants thereof means either 1) to disrupt the fiber structure of a web to weaken it by compressing or moving the fibers apart, or 2) to deflect or displace a web in the "Z" direction, i.e., perpendicular to the plane or surface of a web, or 3) to deflect or displace a web sufficiently to provide a visually perceptible perforation, or 4) to extend completely through a web, to facilitate tearing or separating successive sheets of a fibrous structure by a consumer at defined locations, e.g., in perforations formed along rolls of paper towels, bath tissue and the like.

As used throughout the specification and claims, the phrase "degree of penetration" and any variants thereof means either 1) the extent to which the fibers in a web are compressed or moved apart, or 2) the extent to which the web is deflected or displaced in the "Z" direction, i.e., the direction perpendicular to the plane or surface of a web, or 3) the size of openings which are formed in a web, which determines the strength or weakness of the web between successive defined sheets after a selected perforation design has been formed in the web.

As used throughout the specification and claims, the word "overstrain" and any variants thereof means either 1) to disrupt the fiber structure of a web to weaken it by compressing or moving the fibers apart, or 2) to deflect or displace a web in the "Z" direction, i.e., perpendicular to the plane or surface of a web, or 3) to deflect or displace a web sufficiently to provide a visually perceptible perforation, or 4) to extend completely through a web, to facilitate tearing by a consumer at defined locations, e.g., along rolls of paper towels, bath tissue and the like.

As used throughout the specification and claims, the phrase "degree of overstraining" and any variants thereof means either 1) the extent to which the fibers in a web are compressed or moved apart, or 2) the extent to which the web is deflected or displaced in the "Z" direction, i.e., the direction perpendicular to the plane or surface of a web, or 3) the size of openings which are formed in a web, which determines the strength or weakness of the web after a selected perforation design has been formed in the web.

Additionally, and as used throughout the specification and claims, the phrase "degree of weakening" and any variants thereof, means the extent to which the strength of a web has been weakened as a result of penetration or overstraining of the web which can be controlled by selecting the characteristics such as the size, shape, footprints, etc. of the circumferential protrusions or perforating elements. It also means the extent to which the strength of the web has been weakened as a result of printing a liquid on the web. Further, it will be appreciated that various characteristics may be individually selected to thereby provide the circumferential protrusions, perforating elements and/or liquids with the same or different parametric values to thereby control the degree of weakening of the web at each individual location where it is desired that the web be perforated, e.g., in the cross direction and/or in the machine direction.

In addition to the foregoing, the various embodiments of mechanical perforators and liquid perforators result in improved reliability and lower manufacturing costs while at the same time making it possible to form virtually any desired perforation pattern or design, and it will be understood that the various features and technologies present in any one of the mechanical and liquid perforator embodiments can be appropriately implemented and combined with the features and technologies of any of the other mechanical and liquid perforator embodiments.

In all of the foregoing embodiments and configurations, it will be understood that since the webs may be transported along a path relative to the disclosed apparatus components by a device which may comprise a conventional web rewinder of a type well known in the art, the details of the rewinder and the manner in which it transports the web have not been set forth. Furthermore, the details of the web rewinder are not needed to understand the unique features of the embodiments and configurations disclosed herein and the manner in which they function. Similarly, it will be understood that the details need not be set forth for the controllers, motors, and associated gearing suitable for controlling and driving the various perforating rolls and printing rolls nor for the controllers for controlling the printing of non-contact printing devices such as inkjet printers and laser printers because they are all of types well known in the art.

With regard to non-limiting embodiments utilizing multiple rolls, cylinders or blades, it will be understood that they can utilize linear actuators and/or similar components for purposes of engaging and disengaging the various rolls, cylinders and/or similar components in a manner well known to those skilled in the art.

"Fibrous structure" as used herein means a structure that comprises one or more fibrous elements. In one example, a fibrous structure according to the present invention means an association of fibrous elements that together form a structure capable of performing a function.

The fibrous structures of the present invention may be homogeneous or may be layered. If layered, the fibrous structures may comprise at least 2 and/or at least 3 and/or at least 4 and/or at least 5 and/or at least 6 and/or at least 7 and/or at least 8 and/or at least 9 and/or at least 10 to about 25 and/or to about 20 and/or to about 18 and/or to about 16 layers.

In one example, the fibrous structures of the present invention are disposable. For example, the fibrous structures of the present invention are non-textile fibrous structures. In another example, the fibrous structures of the present invention are flushable such as bath paper.

Non-limiting examples of processes for making fibrous structures include known wet-laid papermaking processes, air-laid papermaking processes and wet, solution and dry filament spinning processes that are typically referred to as nonwoven processes. Further processing of the fibrous structure may be carried out such that a finished fibrous structure is formed. For example, in typical papermaking processes, the finished fibrous structure is the fibrous structure that is wound on the reel at the end of papermaking. The finished fibrous structure may subsequently be converted into a finished product, e.g. a sanitary tissue product.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to thermoplastic polymer filaments, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present invention, a fiber may be a naturally occurring fiber, which means it is obtained from a naturally occurring source, such as a vegetative source, for example a tree and/or plant. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell and bagasse fibers can be used in the fibrous structures of the present invention. The fibrous structure or material of the web products which are the subject of this invention may be a single-ply or a multi-ply fibrous structure suitable for being converted into a through air dried perforated product.

With regard to the web products which are the subject of this invention, they may be referred to as "sanitary tissue products" which, as used herein, means a soft, low density (i.e. <about 0.15 g/cm$^3$) web useful as a wiping implement for post-urinary and post-bowel movement cleaning (bath tissue), for otorhinolaryngological discharges (facial tissue), and multi-functional absorbent and cleaning uses (absorbent towels). The sanitary tissue products may be convolutely wound or rolled upon itself about a core or without a core to form a sanitary tissue product roll. Such product rolls may comprise a plurality of connected, but perforated sheets of fibrous structure, that are separably dispensable from adjacent sheets.

In one example, the sanitary tissue products of the present invention comprise fibrous structures according to the present invention.

"Basis Weight" as used herein is the weight per unit area of a sample reported in lbs/3000 ft$^2$ or g/m$^2$. The sanitary tissue products of the present invention may have a Basis Weight of greater than 15 g/m$^2$ (9.2 lbs/3000 ft$^2$) to about 120 g/m$^2$ (73.8 lbs/3000 ft$^2$) and/or from about 15 g/m$^2$ (9.2 lbs/3000 ft$^2$) to about 110 g/m$^2$ (67.7 lbs/3000 ft$^2$) and/or from about 20 g/m$^2$ (12.3 lbs/3000 ft$^2$) to about 100 g/m$^2$ (61.5 lbs/3000 ft$^2$) and/or from about 30 (18.5 lbs/3000 ft$^2$) to 90 g/m$^2$ (55.4 lbs/3000 ft$^2$). In addition, the sanitary tissue products of the present invention may exhibit a basis weight between about 40 g/m$^2$ (24.6 lbs/3000 ft$^2$) to about 120 g/m$^2$ (73.8 lbs/3000 ft$^2$) and/or from about 50 g/m$^2$ (30.8 lbs/3000 ft$^2$) to about 110 g/m$^2$ (67.7 lbs/3000 ft$^2$) and/or from about 55 g/m$^2$ (33.8 lbs/3000 ft$^2$) to about 105 g/m$^2$ (64.6 lbs/3000 ft$^2$) and/or from about 60 (36.9 lbs/3000 ft$^2$) to 100 g/m$^2$ (61.5 lbs/3000 ft$^2$).

Sanitary tissue products of the present invention may exhibit a Total Dry Tensile value of less than about 3000 g/76.2 mm and/or less than 2000 g/76.2 mm and/or less than 1875 g/76.2 mm and/or less than 1850 g/76.2 mm and/or less than 1800 g/76.2 mm and/or less than 1700 g/76.2 mm and/or less than 1600 g/76.2 mm and/or less than 1560 g/76.2 mm and/or less than 1500 g/76.2 mm to about 450 g/76.2 mm and/or to about 600 g/76.2 mm and/or to about 800 g/76.2 mm and/or to about 1000 g/76.2 mm. In yet another example, the sanitary tissue products, for example single-ply, embossed sanitary tissue products, exhibit a Total Dry Tensile of less than about 1560 g/76.2 mm and/or less than 1500 g/76.2 mm and/or less than 1400 g/76.2 mm and/or less than 1300 g/76.2 mm and/or to about 450 g/76.2 mm and/or to about 600 g/76.2 mm and/or to about 800 g/76.2 mm and/or to about 1000 g/76.2 mm.

The sanitary tissue products of the present invention may exhibit an initial Total Wet Tensile Strength value of less than 600 g/76.2 mm and/or less than 450 g/76.2 mm and/or less than 300 g/76.2 mm and/or less than about 225 g/76.2 mm.

In accordance with the present invention, the web is formed of paper or a like material having one or more plies wherein the material is strong enough to form the wound or rolled product having repeating lines of perforation but weak enough to separate a selected sheet from the remainder of the wound or rolled product. The Perforation Tensile Strength value for sanitary tissue products such as paper towel products, bath tissue products, and the like can be determined by the Perforation Tensile Strength Method described infra.

A single ply paper towel product of the present invention may have a Perforation Tensile Strength value of less than about 150 g/in (1.97 g/76.2 mm), preferably less than about 120 g/in (1.57 g/76.2 mm), even more preferably less than about 100 g/in (1.31 g/76.2 mm), and yet more preferably less than about 50 g/in (0.66 g/76.2 mm). A two ply paper towel product of the present invention may have a Perforation Tensile Strength value of less than about 170 g/in (2.23 g/76.2 mm), more preferably less than about 160 g/in (2.10 g/76.2 mm), even more preferably less than about 150 g/in (1.97 g/76.2 mm), yet more preferably less than about 100 g/in (1.31 g/76.2 mm), even yet more preferably less than about 60 g/in (0.79 g/76.2 mm), and most preferably less than about 50 g/in (0.66 g/76.2 mm) A two-ply bath tissue product of the present invention may have a Perforation Tensile Strength value of less than about 160 g/in (2.10 g/76.2 mm), preferably less than about 150 g/in (1.97 g/76.2 mm), even more preferably less than about 120 g/in (1.57 g/76.2 mm), yet more preferably less than about 100 g/in (1.31 g/76.2 mm), and most preferably less than about 65 g/in (0.85 g/76.2 mm).

The sanitary tissue products of the present invention may exhibit a Density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

"Density" as used herein is calculated as the quotient of the Basis Weight expressed in grams per square meter divided by the Caliper expressed in microns. The resulting Density is expressed as grams per cubic centimeters (g/cm$^3$ or g/cc). Sanitary tissue products of the present invention may have Densities greater than 0.05 g/cm$^3$ and/or greater than 0.06 g/cm$^3$ and/or greater than 0.07 g/cm$^3$ and/or less than 0.10 g/cm$^3$ and/or less than 0.09 g/cm$^3$ and/or less than 0.08 g/cm$^3$. In one example, a fibrous structure of the present invention exhibits a density of from about 0.055 g/cm$^3$ to about 0.095 g/cm$^3$.

"Embossed" as used herein with respect to a fibrous structure means a fibrous structure that has been subjected to a process which converts a smooth surfaced fibrous structure to a decorative surface by replicating a design on one or more emboss rolls, which form a nip through which the fibrous structure passes. Embossed does not include creping, microcreping, printing or other processes that may impart a texture and/or decorative pattern to a fibrous structure. In one example, the embossed fibrous structure comprises deep nested embossments that exhibit an average peak of the embossment to valley of the embossment difference of greater than 600 μm and/or greater than 700 μm and/or greater than 800 μm and/or greater than 900 μm as measured using MicroCAD.

Test Methods

Unless otherwise specified, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. If the sample is in roll form, remove the first 35 to about 50 inches of the sample by unwinding and tearing off via the closest perforation line, if one is present, and discard before testing the sample. All plastic and paper board packaging materials must be carefully removed from the paper samples prior to testing. Discard any damaged product. All tests are conducted in such conditioned room.

a. Perforation Tensile Strength Test Method

Principle:

A strip of sample of known width is cut so that a product perforation line passes across the strip perpendicularly in the narrow (width) dimension about equal distance from either end. The sample is placed in a tensile tester in the normal manner and then tensile strength is determined The point of failure (break) will be the perforation line. The strength of the perforation is reported in grams.

Apparatus:

Conditioned Room: Temperature and humidity controlled within the following limits:

Temperature—73° F.±2° F. (23° C.±1° C.)

Relative Humidity—50% (±2%)

Sample Cutter: JDC Precision Sample Cutter, 1 inch (25.4 mm) wide double edge cutter, Model JDC-1-12 (Recommended), or Model 1 JDC-1-10; equipped with a safety shield, P&G drawing No. A-PP-421; Obtain the cutter from Thwing Albert Instrument Company, 10960 Dutton Road, Philadelphia, Pa. 19154

Cutting Die: (Only for use in cutting samples with the Alpha Cutter) 1.0 inch wide×8.0 inches (25.4×203.2 mm) long on a ¾ inch (19 mm) base; Acme Steel Rule, Die Corp., 5 Stevens St., Waterbury, Conn., 06714, or equivalent. The die must be modified with soft foam rubber insert material.

Soft foam rubber insert material: Polyurethan, ¼ in. (6.3 mm) thick, P-17 Crofteon, Inc., 1801 West Fourth St., Marion, Ind. 46952, or equivalent.

Tensile Tester: Refer to Analytical Method GCAS 58007265 "Testing and Calibration of Instruments—the Tensile Tester"

Tensile Tester Grips: Thwing-Albert TAPPI air grips 00733-95

Calibration Weights: Refer to Analytical Method GCAS 58007265 "Testing and Calibration of Instruments—The Tensile Tester"

Paper Cutter.

Rule: Ruler to check gauge length, 6 inch (152.4 mm) metal, with 0.01 inch (0.25 mm) graduations. Cat. #C305R-6, L.S. Starrett Co., Athel, Mass. 01331, or equivalent.

Resealable Plastic Bags: Recommended size 26.8 cm×27.9 cm.

Sample Preparation:

For this method, a usable unit is described as one finished product unit regardless of the number of plies.

Condition the rolls or usable units of product, with wrapper or packaging materials removed, in a room conditioned at 50±2% relative humidity, 73° F.±2° F. (23° C.±1° C.) for a minimum of two hours. For new roll remove at least the outer 8-10 usable units of product and discard. Do not test samples with defects such as perforation skips, wrinkles, tears, incomplete perfs, holes, etc. Replace with other usable unites free of such defects. For roll wipes, condition in sealed package for a minimum of two hours.

Towels:

At all times handle the samples in such a manner that the perforations between the usable units are not damaged or weakened. Prepare the samples for testing using one of the two methods (i.e., a continuous five-usable unit-strip or four two-usable unit strips) described below. For usable units having a length (MD) greater than 8 inches (203.2 mm), either approach may be used in preparing the sample. For usable units having a length (MD) less than or equal to 8 inches (203.2 mm), use only the approach requiring strips of two towels to prepare the samples for testing.

A. Continuous Strip of 5 Towels

For the continuous strip of five towels, fold the second towel approximately in the center so that the perforation between towels one and two lies exactly on top of the perforation between towels two and three. Continue folding the remaining usable units until the four perforations contained in the strip of five towels are exactly coincident in a stack. Using the paper cutter, make cuts parallel to the usable units a minimum of 7 inches (177.8 mm) wide by towel width long with the perforation aligned, parallel to the long dimension of the stack and approximately in its center.

B. Strip of 2 Towels

Where four pairs of usable units have been taken for the samples, stack these usable unit pairs, one on the other, so that their perforations are exactly coincident. Proceed as described above to cut this stack of usable units so that the coincident perforations are in the approximate middle of a 7 inch (177.8 mm) minimum by roll width stack and parallel to the stack long dimension.

Bath Tissue/Roll Wipes:

At all times the sample should be handled in such a manner that perforations between usable units are not damaged or weakened. Remove four strips of two usable units each whether consecutively or from various positions in the sample.

Lay the four strips, one on top of the other, being very careful that the perforations between the usable unit pairs are exactly coincident. Note: For roll wipes place the remaining wipes in a resealable plastic bag and seal bag. Test roll wipes immediately.

Using either a JDC cutter or a cutting die and Alpha cutter, cut a one-inch (25.4 mm) wide sample strip four finished product units thick in the machine direction of the stack of four thicknesses of product obtained by one of the above techniques. The result will be a strip of sample four finished product units thick, one-inch (25.4 mm) wide by a minimum of seven inches (177.8 mm) long, having a perforation line perpendicular to the 8 inch (203.2 mm) dimension of the strip and in its approximate center.

Reference Table 1 for preparation and Tensile Tester settings.

TABLE 1

| | Perforation Strength Preparation | | | |
| Sample Description | Number of product units per test | Number of replicates per sample | Load divider | Tensile grip type |
| --- | --- | --- | --- | --- |
| Towel | 1 | 4 | 1 | Flat |
| Bath | 1 | 4 | 1 | Flat |

TABLE 1-continued

Perforation Strength Preparation

| Sample Description | Number of product units per test | Number of replicates per sample | Load divider | Tensile grip type |
|---|---|---|---|---|
| Tissue/Roll Wipes | | | | |

Operation:
Reject results from any strip where the sample is not completely broken, preparing a replacement strip for testing as described in Sample Preparation (see examples below).

Towel (Work-to-Tear and Perforation Stretch):
Clamp the sample in the grips of a properly calibrated tensile tester. Determine the tensile strength and perforation stretch of each of the four strips of each sample. Each strip should break completely at the perforation. In cases where an Intelect 500 Tensile Tester is employed, a sensitivity of 0 g should be used to achieve this.

Bath Tissue/Roll Wipes (Perforation Strength and/or Work-to-Tear and Perforation Stretch):
Clamp the sample in the grips of a properly calibrated tensile tester. Determine the tensile strength of each of the four strips of each sample and/or determine the tensile strength and perforation stretch of each of the four strips of each sample. Each strip should break at the perforation. In cases where an Intelect 500 Tensile Tester is employed, a sensitivity of 0 g should be used to achieve this.

Calculations:
Since some tensile testers incorporate computer capabilities that support calculations, it may not be necessary to apply all of the following calculations to the test results. For example, the Thwing-Albert Intelect II STD tensile tester can be operated through its averaging mode for reporting the average perforation tensile strength and average perforation stretch.

Perforation Tensile Strength (All Products):
The perforation tensile is determined by dividing the sum of the perforation tensile strengths of the product by the number of strips tested.

$$\text{Perforation Tensile} = \frac{\text{Sum of tensile results for strips tested (grams)}}{\text{Number of strips tested}}$$

Perforation Stretch:
The perforation stretch is determined by dividing the sum of the perforation stretch readings of the product by the number of strips tested.

$$\text{Perforation Stretch} = \frac{\text{Sum of stretch results for strips tested (\%)}}{\text{Number of strips tested}}$$

"Work"-to-Tear Factor:

$$\text{Work-to-tear Factor}(WTTF) = \frac{\text{Perforation Tensile} \times \text{Perforation stretch}}{100}$$

Perforation Tensile to MD Tensile Ratio (PERFMD) (Tissue Only):

$$PERFMD = \frac{\text{Perforation Tensile}}{\text{Average Tensile Strength }(MD)}$$

b. Tensile Strength Test Method
Remove five (5) strips of four (4) usable units (also referred to as sheets) of fibrous structures and stack one on top of the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co. of Philadelphia, Pa.) to make 4 separate stacks. Make sure stacks 1 and 3 are still identified for machine direction testing and stacks 2 and 4 are identified for cross direction testing.

Cut two 1 inch (2.54 cm) wide strips in the machine direction from stacks 1 and 3. Cut two 1 inch (2.54 cm) wide strips in the cross direction from stacks 2 and 4. There are now four 1 inch (2.54 cm) wide strips for machine direction tensile testing and four 1 inch (2.54 cm) wide strips for cross direction tensile testing. For these finished product samples, all eight 1 inch (2.54 cm) wide strips are five usable units (sheets) thick.

For the actual measurement of the tensile strength, use a Thwing-Albert Intelect II Standard Tensile Tester (Thwing-Albert Instrument Co. of Philadelphia, Pa.). Insert the flat face clamps into the unit and calibrate the tester according to the instructions given in the operation manual of the Thwing-Albert Intelect II. Set the instrument crosshead speed to 4.00 in/min (10.16 cm/min) and the 1st and 2nd gauge lengths to 2.00 inches (5.08 cm). The break sensitivity is set to 20.0 grams and the sample width is set to 1.00 inch (2.54 cm) and the sample thickness is set to 0.3937 inch (1 cm). The energy units are set to TEA and the tangent modulus (Modulus) trap setting is set to 38.1 g.

Take one of the fibrous structure sample strips and place one end of it in one clamp of the tensile tester. Place the other end of the fibrous structure sample strip in the other clamp. Make sure the long dimension of the fibrous structure sample strip is running parallel to the sides of the tensile tester. Also make sure the fibrous structure sample strips are not overhanging to the either side of the two clamps. In addition, the pressure of each of the clamps must be in full contact with the fibrous structure sample strip.

After inserting the fibrous structure sample strip into the two clamps, the instrument tension can be monitored. If it shows a value of 5 grams or more, the fibrous structure sample strip is too taut. Conversely, if a period of 2-3 seconds passes after starting the test before any value is recorded, the fibrous structure sample strip is too slack.

Start the tensile tester as described in the tensile tester instrument manual. The test is complete after the crosshead automatically returns to its initial starting position. When the test is complete, read and record the following with units of measure:

Peak Load Tensile (Tensile Strength) (g/in)
Test each of the samples in the same manner, recording the above measured values from each test.

Calculations:

Total Dry Tensile (TDT)=Peak Load MD Tensile (g/in)+Peak Load CD Tensile (g/in)

Tensile Ratio=Peak Load MD Tensile (g/in)/Peak Load CD Tensile (g/in)

Table 2 below tabulates some measured tensile values of various commercially available fibrous structures.

TABLE 2

Total and Perforation Tensile Strength Values for Various Substrates

| Fibrous Structure | # of Plies | Embossed | TAD[1] | Total Dry Tensile Strength g/76.2 mm | Perforation Tensile Strength g/in |
|---|---|---|---|---|---|
| Charmin ® Basic | 1 | N | Y | 1486 | |
| Channin ® Basic | 1 | N | Y | 1463 | |
| Charmin ® Ultra Soft | 2 | N | Y | 1457 | 171 |

TABLE 2-continued

Total and Perforation Tensile Strength Values for Various Substrates

| Fibrous Structure | # of Plies | Embossed | TAD[1] | Total Dry Tensile Strength g/76.2 mm | Perforation Tensile Strength g/in |
|---|---|---|---|---|---|
| Charmin ® Ultra Strong | 2 | Y | Y | 2396 | 190 |
| Cottonelle ® | 1 | N | Y | 1606 | |
| Cottonelle ® | 1 | N | Y | 1389 | |
| Cottonelle ® Ultra | 2 | N | Y | 1823 | 174 |
| Cottonelle ® Ultra | 2 | N | Y | 2052 | |
| Scott ® 1000 | 1 | Y | N | 1568 | 271 |
| Scott ® Extra Soft | 1 | N | Y | 1901 | 176 |
| Scott ® Extra Soft | 1 | Y | Y | 1645 | 223 |
| Bounty ® Basic | 1 | N | Y | 3827 | |
| Bounty ® Basic | 1 | Y | Y | 3821 | |
| Viva ® | 1 | N | Y | 2542 | 153 |
| Quilted Northern ® Ultra Plush | 3 | Y | N | 1609 | 166 |
| Quilted Northern ® Ultra | 2 | Y | N | 1296 | |
| Quilted Northern ® | 2 | Y | N | 1264 | |
| Angel Soft ® | 2 | Y | N | 1465 | 166 |

[1]"TAD" as used herein means through air dried.

With regard to the foregoing parametric values, they are non-limiting examples of physical property values for some fibrous structures or materials that can be utilized for sanitary tissue products that can be formed as a wound or rolled web in accordance with the present invention. These non-limiting examples are materials which are strong enough to enable a wound or rolled web product to be formed having repeating lines of perforation defining a plurality of sheets. Further, these non-limiting examples are materials which are also weak enough to enable a consumer to separate a selected one of the sheets, typically the end sheet, from the remainder of the wound or rolled product by tearing along one of the lines of perforation defining the sheet.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. A web product having a machine direction, a cross direction co-planar and orthogonal thereto, and a Z-direction orthogonal to both the machine and cross directions, the web product having lines of weakness in both the cross direction and the machine direction, comprising:
   a web formed of a fibrous material having one or more plies to be converted into a through air dried perforated product and having a first side, a second side, a cross direction and a machine direction, the web having a plurality of spaced apart and repeating lines of weakness formed of individual deflected or displaced fibers formed by overstraining the individual fibers in the Z-direction of the fibrous material, the lines of weakness extending generally in the cross direction of the web, the web also having at least one line of weakness formed in the fibrous material extending generally in the machine direction of the web, each of the plurality of individual deflected or displaced fibers formed in the fibrous material selectively located relative to adjacent ones of the individual deflected or displaced fibers;
   whereby a selected perforation design is provided on the web comprised of the repeating lines of weakness in the fibrous material generally in the cross direction and the at least one line of weakness in the fibrous material generally in the machine direction.

2. The product of claim 1 wherein the lines of weakness are produced by passing the web between a rotatable ring roll having a circumferential groove extending about an outer surface thereof and a rotatable pattern roll having a plurality of circumferential protrusions extending from an outer surface thereof, the circumferential protrusions on the pattern roll being cooperatively aligned with the circumferential groove in the ring roll for penetrating the fibrous material of the web to thereby produce the individual deflected or displaced fibers in the fibrous material extending generally in at least one of the cross direction and the machine direction of the web, respectively.

3. The product of claim 1 wherein the lines of weakness are produced by passing the web between a rotatable female roll having a pocket disposed in an outer surface thereof and a rotatable male roll having a plurality of perforating elements extending generally outwardly from an outer surface thereof, the perforating elements on the male roll each defining a web contacting edge and being cooperatively positioned to be received within the pocket in the female roll to thereby produce the individual deflected or displaced fibers in the fibrous material extending generally in at least one of the cross direction and the machine direction of the web, respectively.

4. The product of claim 1 wherein the lines of weakness in the fibrous material are produced by passing the web by a plurality of individual liquid printing devices for printing a liquid onto the fibrous material of the web in at least one of the cross direction and the machine direction.

5. The product of claim 1 wherein the at least one line of weakness extending generally in the machine direction of the web is produced by a rotary cutting die forming the individual perforations in the fibrous material comprising the at least one line of perforations extending generally in the machine direction of the web so as to be generally perpendicular to the individual deflected or displaced fibers in the fibrous material extending generally in the cross direction of the web.

6. The product of claim 1 wherein the selected perforation design is nonlinear at least in the cross direction.

7. A web product having lines of weakness comprising:
   a web formed of a fibrous material having one or more plies to be converted into a through air dried product and having a first side, a second side, a cross direction, a machine direction, and a Z-direction, the web having a plurality of spaced apart and repeating lines of weakness formed of individual deflected or displaced fibers formed by overstraining the individual fibers in the Z-direction of the fibrous material and extending generally in the cross direction of the web, a notch removed from each of the first and second sides of the web at the ends of each of the repeating lines of weakness extending in the cross direction of the web, the web also having at least one line of weakness formed of individual perforations in the fibrous material extending generally in the machine direction of the web, each of the plurality of individual deflected or displaced fibers in the fibrous material selectively located relative to adjacent ones of the individual deflected or displaced fibers formed;

whereby a selected perforation design is provided on the web comprised of the repeating lines of weakness in the fibrous material generally in the cross direction and the at least one line of deflected or displaced fibers formed in the fibrous material generally in the machine direction.

8. The product of claim 7 wherein the lines of weakness are produced by passing the web between a rotatable ring roll having a circumferential groove extending about an outer surface thereof and a rotatable pattern roll having a plurality of circumferential protrusions extending from an outer surface thereof, the circumferential protrusions on the pattern roll being cooperatively aligned with the circumferential groove in the ring roll for penetrating the fibrous material of the web to thereby produce the individual deflected or displaced fibers in the fibrous material extending generally in at least one of the cross direction and the machine direction of the web, respectively.

9. The product of claim 7 wherein the lines of weakness are produced by passing the web between a rotatable female roll having a pocket disposed in an outer surface thereof and a rotatable male roll having a plurality of perforating elements extending generally outwardly from an outer surface thereof, the perforating elements on the male roll each defining a web contacting edge and being cooperatively positioned to be received within the pocket in the female roll to thereby produce the individual deflected or displaced fibers in the fibrous material extending generally in at least one of the cross direction and the machine direction of the web, respectively.

10. The product of claim 7 wherein the at least one line of perforations extending generally in the machine direction of the web is produced by a rotary cutting die forming the individual perforations in the fibrous material comprising the at least one line of perforations extending generally in the machine direction of the web so as to be generally perpendicular to the individual deflected or displaced fibers in the fibrous material extending generally in the cross direction of the web.

11. The product of claim 7 wherein each of the notches removed from the web is produced by a cutting die for thereby defining a plurality of individual sheet separation points along the first and second sides of the web at the end of each of the spaced apart and repeating lines of weakness formed of individual deflected or displaced fibers in the fibrous material.

12. The product of claim 7 wherein the selected perforation design is nonlinear at least in the cross direction.

13. A web product having lines of weakness in both the cross direction and the machine direction, comprising:

a web formed of a fibrous material having one or more plies to be converted into a through air dried product and having a first side, a second side, a cross direction, a machine direction and a Z-direction, the web having a plurality of spaced apart and repeating lines of weakness formed of individual deflected or displaced fibers formed by overstraining the individual fibers in the Z-direction of the fibrous material extending generally in the cross direction of the web, an aesthetic pattern embossed or printed on the fibrous material of the web, the web also having at least one line of weakness formed of individual perforations in the fibrous material extending generally in the machine direction of the web, each of the plurality of individual perforations in the fibrous material selectively located relative to adjacent ones of the individual perforations;

whereby a selected perforation design is provided on the web comprised of the repeating lines of weakness in the fibrous material generally in the cross direction and the at least one line of weakness in the fibrous material generally in the machine direction.

14. The product of claim 13 wherein the lines of weakness are produced by passing the web between a rotatable ring roll having a circumferential groove extending about an outer surface thereof and a rotatable pattern roll having a plurality of circumferential protrusions extending from an outer surface thereof, the circumferential protrusions on the pattern roll being cooperatively aligned with the circumferential groove in the ring roll for penetrating the fibrous material of the web to thereby produce the individual deflected or displaced fibers in the fibrous material extending generally in at least one of the cross direction and the machine direction of the web, respectively.

15. The product of claim 13 wherein the lines of weakness are produced by passing the web between a rotatable female roll having a pocket disposed in an outer surface thereof and a rotatable male roll having a plurality of perforating elements extending generally outwardly from an outer surface thereof, the perforating elements on the male roll each defining a web contacting edge and being cooperatively positioned to be received within the pocket in the female roll to thereby produce the individual deflected or displaced fibers in the fibrous material extending generally in at least one of the cross direction and the machine direction of the web, respectively.

16. The product of claim 13 wherein the at least one line of perforations extending generally in the machine direction of the web is produced by a rotary cutting die forming the individual perforations in the fibrous material comprising the at least one line of perforations extending generally in the machine direction of the web so as to be generally perpendicular to the individual deflected or displaced fibers in the fibrous material extending generally in the cross direction of the web.

17. The product of claim 13 wherein the aesthetic pattern embossed or printed on the fibrous material of the web is produced by an embossing or printing device and the selected perforation design matches the aesthetic pattern embossed or printed on the fibrous material of the web by the embossing or printing device.

18. The product of claim 13 wherein the selected perforation design is nonlinear at least in the cross direction.

* * * * *